Oct. 5, 1965    R. W. ELLIOTT    3,210,095
PLASTIC LINED CONDUIT AND METHOD OF CONSTRUCTION
Filed March 2, 1962
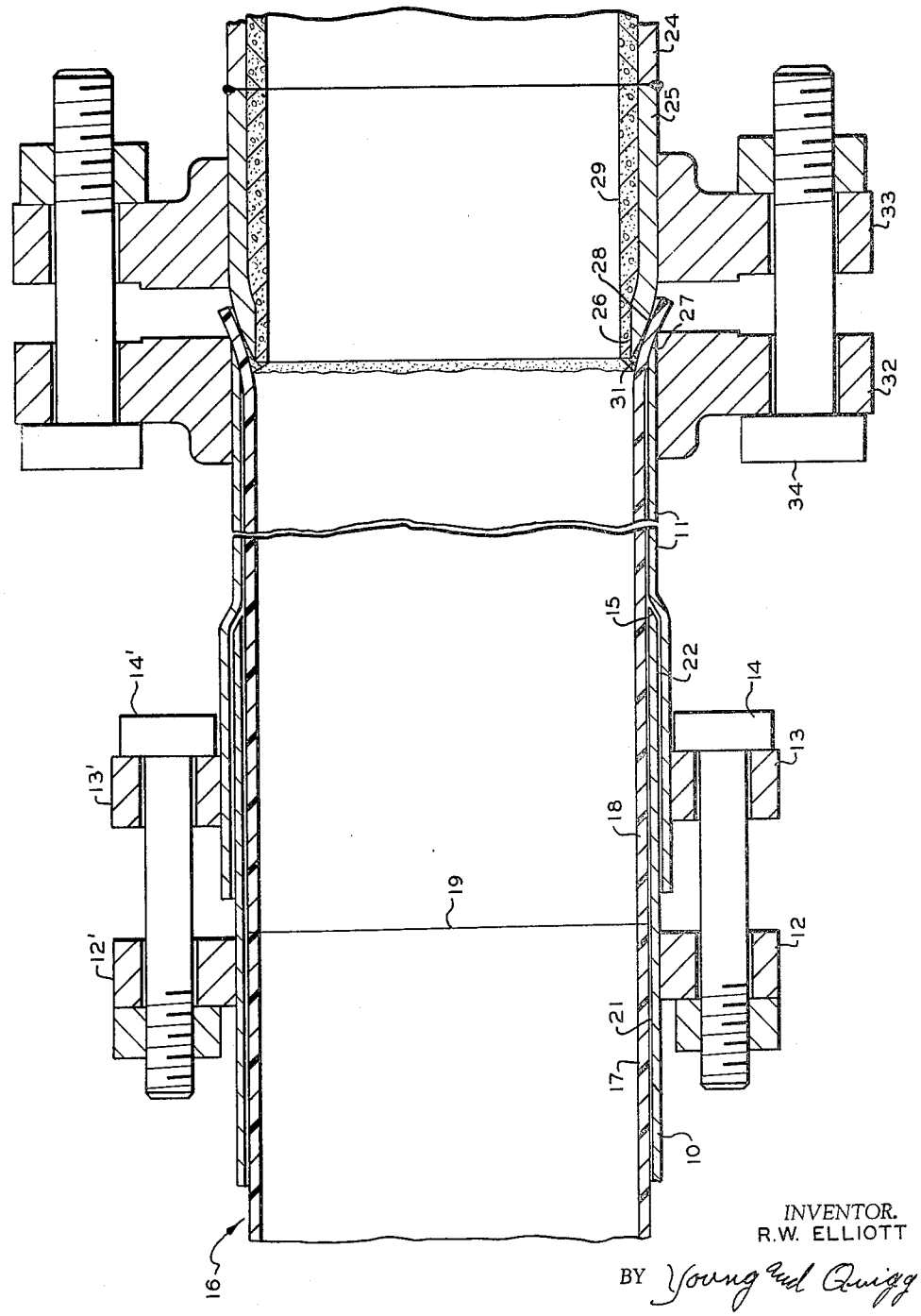
INVENTOR.
R.W. ELLIOTT
BY *Young and Quigg*
ATTORNEYS United States Patent Office 3,210,095
Patented Oct. 5, 1965

3,210,095
PLASTIC LINED CONDUIT AND METHOD
OF CONSTRUCTION
Ralph W. Elliott, Bartlesville, Okla., assignor to Phillips
Petroleum Company, a corporation of Delaware
Filed Mar. 2, 1962, Ser. No. 177,106
1 Claim. (Cl. 285—55)

This invention relates to conduit having a thermoplastic lining for protection of the conduit from corrosion in service wherein corrosive fluids are transported through the conduit. The invention also relates, in another aspect, to a thermoplastic conduit enclosed in a reinforcing metal, or other pressure resistant material, casing. Still another aspect of the invention is in a method for securing a thermoplastic liner in a pressure resistant conduit.

For many years pipes and other conduits have been lined with hydraulic cement and such cement lined pipes have been used for handling oil field brines and other corrosive fluids, particularly fluids which are encountered in the petroleum industry. While these cement linings have provided a measure of protection for the pipe lines, there have often been failures in such installations which have presented an ever-present problem of detecting and replacing pipe lines or sections of pipe lines wherein the lining has failed. Minute cracks which sometimes occur in the lining, possibly as a result of expansion and contraction of the metal pipe or as a result of flexing the pipe during handling or during use, allow corrosive fluids to penetrate the lining and attack the pipe. Anything which causes a rupture of the hydraulic cement lining will tend to result in failure of the pipe when such pipe is used to transport corrosive fluids. In one particular installation where sulfate-reducing bacteria are known to be present in the crude oil and salt water being transported cement lined steel pipe has been found to be very little better than unlined steel pipe. Such bacteria have been found beneath the cement lining of cement lined pipe; however, if the cement lining allows the fluids being transported to come in contact with the metal pipe, corrosion can result in galvanic action or chemical action in addition to attack by bacteria.

Resinous or plastic materials such as polyvinylchloride, solid polyolefins, nylon, natural and synthetic rubber, and the like, have been proposed for use in conduits transporting corrosive fluids; however, such materials lack the tensile strength required for high pressure service and therefore the use of such materials has been limited.

Various proposals have been made for combining thermoplastic linings with materials such as hydraulic cements, e.g., hydraulic cement or other material occupying the annulus between the metal conduit and the thermoplastic lining of the conduit. Some of these proposals have proven successful in controlling the corrosion of steel pipe in corrosive service; however, the expense involved in producing such conduit has prevented widespread use. Furthermore, conduits containing hydraulic cement liners or partial liners must be protected from blows or vibration which would fracture the cement.

An object of this invention is to provide a simple and economic method for lining a conduit with thermoplastic materials. It is also an object to provide a simple method for reinforcing a thermoplastic tube with a pressure resistant casing. A further object of the invention is to provide a thermoplastic lined conduit having a novel coupling to allow entrapped air in the annulus between the lining and conduit to escape. Still another object of the invention is to provide a thermoplastic lined conduit with nothing added to the annulus between the lining and conduit. The provision of a method for reinforcing a thermoplastic tube without the need for adding a material to the annulus between the thermoplastic and the enclosing, reinforcing casing is another object of the invention. Other objects and advantages will be apparent to one skilled in the art upon consideration of the description of the invention and the attached drawing.

The single figure of the drawing is a sectional elevation of a conduit and couplings of the invention.

I have discovered that a thermoplastic liner can be placed in a pressure resistant conduit such as a steel pipe with no filler in the annulus between the liner and conduit provided certain precautionary conditions are observed. The thermoplastic liner should be small enough to slide easily into the conduit; however, the annulus between the liner and conduit should be such that the maximum radial expansion of the thermoplastic resin liner will be not greater than about 3 percent of the diameter of the liner. This value of 3 percent will apply to any thermoplastic material having a percent elongation value of at least 15 as determined by ASTM method D638–58T. A thermoplastic resin having an elongation value below 15 percent will require less than the 3 percent.

For a conduit having an I.D. of one inch and greater, the annulus between the liner and conduit should be between about 0.01 and 0.07 inch.

It has been found that a substantially smooth, continuous inner surface must be provided in the conduit which encases the thermoplastic liner because the internal pressure will cause the thermoplastic material to extrude through a relatively small opening as a result of the cold flow characteristics of most thermoplastic materials. An outside bevel on the spigot end of bell and spigot conduit will obviate or reduce the gap on the inner surface of the conduit at the coupling so as to prevent the thermoplastic material extruding into the gap. If the conduit has a square end the depth of the gap will be substantially the wall thickness of the conduit. The outside bevel should be such that the depth of the gap is not more than about 0.05 inch. The sharp edge of the bevel should be smoothed or rounded so as to withstand normal handling.

The conduit which encases and reinforces the thermoplastic resin will usually be fabricated from metal; however, the invention is not limited to metal conduit because any pressure resistant conduit can be utilized.

Thermoplastic materials having an elongation value of at least 15 percent include polyethylene; polypropylene; acrylonitrile-butadiene-styrene copolymers; polychlorotrifluoroethylene; polytetrafluoroethylene; vinyl polymers and copolymers; nylon; chlorinated polyether; cellulose acetate; cellulose nitrate; and the like.

A particularly preferred class of materials for making the thermoplastic conduit liners of this invention is the class of solid linear polymers of 1-olefins, particularly linear solid polyethylene and solid copolymers of ethylene and higher 1-olefins such as propylene, 1-butene and the like, prepared by the low pressure polymerization of ethylene or copolymerization of ethylene and a higher molecular weight 1-olefin in the presence of an organic diluent and a solid catalyst. Such polyethylene and copolymers can be prepared by the method described in U.S. Patent 2,825,721 issued March 4, 1958 to J. P. Hogan et al.

In the drawing, the spigot end of a section 10 of conduit is secured in the bell end of a section 11 of similar conduit by flanges 12–13 and bolts 14. The spigot end of conduit section 10 is beveled as shown at 15 to conform substantially to the contour of the bell of the adjacent section 11 of conduit so as to provide a substantially gap-free inner surface of conduit.

A continuous thermoplastic liner 16 is positioned in the conduit sections 10–11 and can be formed by joining together thermoplastic sections such as 17 and 18 e.g. by welding or fusing as at 19. The annulus 21 between liner 16 and the conduit sections 10–11 is usually maintained at the minimum required to allow positioning the liner in the conduit and the air present in the annulus escapes through the space 22 which exists between the spigot end of conduit section 10 and the bell of conduit 11. No sealant is utilized in the bell and spigot connection, therefore air can readily escape when the liner is expanded against the conduit.

The lined conduit can be connected at its terminus to a fitting, e.g. a section of cement lined pipe as shown. Cement lined pipe 24 is welded, by conventional means, to a cement lined fitting 25 which is fabricated by boring out the small end of a swage nipple of the same O.D. as that of conduit 11 so that the I.D. of the bored end 26 is substantially the same as that of the thermoplastic liner; and lining the bored swage nipple with cement. The fitting can also be fabricated by forming a bevel or chamfer on the outside end of a conduit having an O.D. the same as that of conduit 11 and having a wall thickness at least equal to the combined wall thickness of the liner 16 and the conduit 11. The inside spigot end of conduit 11 is beveled at 27 to conform substantially to the tapered or chamfered end 28 of the fitting 25. The cement lining 29 of swage nipple 25 does not protect the taper 28 which extends into the interior of the thermoplastic lining 16 and this area is protected by a cementing or caulking material 31 such as X-Pando Special No. 2 Pipe Joint Compound, a material designed to seal the space between cement linings prior to welding sections of cement lined pipe. This is a hydraulic cement available from the X-Pando Corporation, Long Island City, New York. Other sealing or caulking materials can be used which will expand upon curing so as to protect exposed elements.

The fitting 25 and conduit 11 are secured together by flanges 32–33 and bolts 34.

The following example will be helpful in attaining an understanding of the invention; however, the example is not to be construed as limiting the invention.

*Example*

A lead-line carrying the production from seven oil wells to a tank battery was constructed according to the invention as illustrated in the drawing. The production was a mixture of gas, oil and salt water.

A fused-joint liner of a copolymer of ethylene and 1-butene was placed inside a steel pipe line with no filler in the annulus between the liner and the pipe. The pipe was made up of bell and spigot sections with the spigot ends beveled on the outside edge as shown in the drawing. The sections of pipe were secured together by two bolted lugs welded to each of the pipe ends. The lined pipe was joined to cement lined pipe as shown in the drawing.

Dimensions of the pipe and liner were as follows:

| | |
|---|---|
| O.D. of steel pipe | 4.5 inches±0.045 |
| Wall thickness | 0.125 inch |
| I.D. of steel pipe | 4.250 inches±0.045 |
| O.D. of polyethylene liner | 4.170 inches±0.015 |
| Wall thickness | 0.1 inch |
| Annulus (based on radius) | 0.04 inch |

Working pressure for the lined pipe is 600 p.s.i. (calculated pressure at failure is 1200 p.s.i.). The working pressure can be increased by increasing the number or strength of the lugs and bolts which hold the sections together. The bursting strength of the pipe alone is 2600 p.s.i.

The actual working pressure of the above installation was 60–150 p.s.i. The above installation has been operating satisfactorily for more than three months with no indication of failure at any point. A leak in the polyethylene liner would be detected by the appearance of fluid at the nearest coupling because fluid would be forced out where the air of the annulus escapes. Cement lined pipe has failed in this service in a shorter time than the present installation has been in service.

The thermoplastic resin utilized in fabricating the liner was a copolymer of ethylene and 1-butene (2.5% 1-butene) having the following properties:

| | |
|---|---|
| Density ASTM D1505–57T | 0.950 gms./cc. |
| Melt index ASTM D1238–57T | 0.3 |
| Elongation ASTM D638–58T | 70 20 in./min. percent |

The above example demonstrates that this invention provides a simple and economical method for protecting conduits from the corrosive action of fluids contained therein.

Variations and modifications are possible within the scope of the disclosure without departing from the spirit and scope of the invention.

That which is claimed is:

A corrosion resistant coupling assembly comprising a first steel conduit having an inside bevel in its end; a thermoplastic liner positioned in said first conduit and extending beyond the beveled end of the conduit; a cement lined second conduit having an outside diameter and wall thickness greater than that of said first conduit, and having one end thereof turned inwardly to form a curved outside bevel on its end positioned in the beveled end of said first conduit so that the thermoplastic liner is wedged between the end of the bevel of said first conduit and the curved wall of the bevel of the second conduit; a protective layer of hydraulic cement covering the inwardly exposed portion of the curved beveled end of said second conduit and forming a fillet between the inner periphery of the cement lining and the thermoplastic liner; and means to maintain said second conduit positioned in said first conduit so as to wedge the thermoplastic liner between the beveled conduit ends.

References Cited by the Examiner

UNITED STATES PATENTS

| | | | |
|---|---|---|---|
| 219,980 | 9/79 | Roberts | 285—288 X |
| 935,412 | 9/09 | Rust | 285—334.4 |
| 1,743,431 | 1/30 | Congable | 285—175 |
| 1,913,246 | 6/33 | Saine | 285—334.4 |
| 2,086,134 | 7/37 | Ludwick | 29—421 |
| 2,263,021 | 11/41 | Uecker | 285—55 X |
| 2,303,311 | 11/42 | Gredell | 285—331 |
| 2,322,587 | 6/43 | Payne | 285—284 |
| 2,340,537 | 2/44 | Keener | 285—288 X |
| 2,982,311 | 5/61 | Haskell | 285—55 |
| 3,018,120 | 1/62 | Vann | 285—55 |
| 3,047,937 | 8/62 | De Vecchi | 285—55 |
| 3,050,786 | 8/62 | St. John et al. | 285—55 |

FOREIGN PATENTS

| | | |
|---|---|---|
| 810,400 | 3/59 | Great Britain. |
| 1,197,381 | 6/59 | France. |

CARL W. TOMLIN, *Primary Examiner.*